United States Patent
Ashtaputre et al.

(10) Patent No.: US 9,548,887 B2
(45) Date of Patent: Jan. 17, 2017

(54) PROACTIVE CREATION OF MULTICAST STATE IN AN OVERLAY TRANSPORT NETWORK TO ACHIEVE FAST CONVERGENCE ON FAILOVER

(71) Applicant: Cisco Technology, Inc., San Jose, CA (US)

(72) Inventors: Vrushali Ashtaputre, San Jose, CA (US); Gaurav Badoni, San Jose, CA (US); Dhananjaya Rao, Milpitas, CA (US); Sreenivas Duvvuri, San Jose, CA (US); Hasmit Grover, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 132 days.

(21) Appl. No.: 14/182,429

(22) Filed: Feb. 18, 2014

(65) Prior Publication Data

US 2015/0043329 A1     Feb. 12, 2015

Related U.S. Application Data

(60) Provisional application No. 61/864,019, filed on Aug. 9, 2013.

(51) Int. Cl.
| | | |
|---|---|---|
| *H04L 12/24* | (2006.01) | |
| *H04L 12/46* | (2006.01) | |
| *H04L 12/18* | (2006.01) | |

(52) U.S. Cl.
CPC ....... *H04L 41/0668* (2013.01); *H04L 12/1886* (2013.01); *H04L 12/4633* (2013.01); *H04L 12/4675* (2013.01)

(58) Field of Classification Search
CPC .. H04L 41/0668; H04L 12/18; H04L 12/1886; H04L 12/4675; H04L 12/4633
USPC . 370/216, 222, 252, 219, 225, 254; 709/249
See application file for complete search history.

(56) References Cited

U.S. PATENT DOCUMENTS

| | | | |
|---|---|---|---|
| 6,856,991 | B1 | 2/2005 | Srivastava |
| 7,159,034 | B1 | 1/2007 | Rai |
| 7,483,387 | B2 | 1/2009 | Guichard et al. |
| 8,166,205 | B2 | 4/2012 | Farinacci et al. |
| 2003/0026260 | A1 | 2/2003 | Ogasawara et al. |
| 2003/0112799 | A1 | 6/2003 | Chandra et al. |
| 2003/0142685 | A1 | 7/2003 | Bare |

(Continued)

OTHER PUBLICATIONS

Rosen et al., "BGP/ MPLS VPNs", Network Working Group Request for Comments: 2547, Mar. 1999, http://tools.ietf.org/html/rfc2547, 26 Pages.

*Primary Examiner* — Kwang B Yao
*Assistant Examiner* — Syed M Bokhari
(74) *Attorney, Agent, or Firm* — Edell, Shapiro & Finnan, LLC

(57) ABSTRACT

Techniques are provided for designating, in an overlay transport virtualization (OTV) network connected to a data center, an edge device to act as a backup authoritative edge device (BAED) for an authoritative edge device (AED) for multicast packet encapsulation and forwarding. Data traffic associated with a given virtual local area network (VLAN) may be detected from a multicast source in the data center addressed to recipients in a site group. A mapping may be generated between the site group and a core data group in the OTV network for traffic from the multicast source. Advertisements may be sent of the mapping to edge devices in another data center across the OTV network. A similar configuration is presented for a BAED for inbound multicast traffic to a data center.

15 Claims, 22 Drawing Sheets

(56) References Cited

U.S. PATENT DOCUMENTS

| | | |
|---|---|---|
| 2003/0225887 A1 | 12/2003 | Purnadi et al. |
| 2005/0083955 A1 | 4/2005 | Guichard et al. |
| 2005/0141499 A1 | 6/2005 | Ma et al. |
| 2005/0149531 A1 | 7/2005 | Srivastava |
| 2005/0163146 A1 | 7/2005 | Ota et al. |
| 2005/0283531 A1 | 12/2005 | Chen et al. |
| 2006/0002299 A1 | 1/2006 | Mushtaq et al. |
| 2006/0159083 A1 | 7/2006 | Ward et al. |
| 2006/0198323 A1 | 9/2006 | Finn |
| 2006/0209831 A1 | 9/2006 | Shepherd et al. |
| 2007/0076732 A1 | 4/2007 | Kim |
| 2007/0189221 A1 | 8/2007 | Isobe et al. |
| 2007/0264997 A1 | 11/2007 | Chaudhary et al. |
| 2008/0120176 A1 | 5/2008 | Batni et al. |
| 2008/0304412 A1 | 12/2008 | Schine et al. |
| 2008/0304476 A1 | 12/2008 | Pirbhai et al. |
| 2009/0037607 A1* | 2/2009 | Farinacci ............ H04L 12/4641 709/249 |
| 2009/0083403 A1 | 3/2009 | Xu et al. |
| 2010/0020806 A1 | 1/2010 | Vahdat et al. |
| 2010/0315946 A1* | 12/2010 | Salam ................... H04L 12/437 370/222 |
| 2011/0310729 A1 | 12/2011 | Raman et al. |
| 2012/0106322 A1* | 5/2012 | Gero .................... H04L 12/437 370/225 |
| 2012/0131216 A1 | 5/2012 | Jain et al. |
| 2012/0182885 A1* | 7/2012 | Bradford ............ H04L 12/2697 370/252 |
| 2013/0021896 A1* | 1/2013 | Pu et al. ....................... 370/216 |
| 2013/0114465 A1* | 5/2013 | McGovern ............. H04L 41/12 370/254 |

\* cited by examiner

PROACTIVE CREATION OF MULTICAST STATE IN AN OVERLAY TRANSPORT NETWORK TO ACHIEVE FAST CONVERGENCE ON FAILOVER

CROSS-REFERENCE TO RELATED APPLICATION

This application claims priority to U.S. Provisional Application No. 61/864,019, filed Aug. 9, 2013, the entirety of which is incorporated herein by reference.

TECHNICAL FIELD

The present disclosure relates to data center network connectivity.

BACKGROUND

An Overlay Transport Virtualization (OTV) protocol has been developed to connect a layer 2 network domain that spans across multiple data center sites. The OTV protocol uses a "MAC-in-Internet Protocol (IP)" encapsulation technique to extend the layer 2 domain logically over a layer 3 IP network. Since the OTV protocol uses IP, it does not require any pseudo-wire or tunnel maintenance and provides multi-point connectivity using any available transport.

To avoid issues with data loops and the Spanning Tree Protocol (STP), the OTV protocol supports only a per-virtual local area network (VLAN) load-balancing. For a given VLAN, only one OTV edge switch is permitted to forward packets in and out of the network. This edge switch is known as an authorized edge device (AED).

DESCRIPTION OF EXAMPLE EMBODIMENTS

Overview

Techniques are presented herein for designating in an overlay transport virtualization (OTV) network connected to a data center site an edge device to act as a backup authoritative edge device (BAED), also referred to herein as a "non-AED" for an authoritative edge device (AED) for multicast packet encapsulation and forwarding. Data traffic associated with a given virtual local area network (VLAN) is detected from a multicast source in the data center site addressed to recipients in a site group. A mapping is generated between the site group and a core data group in the OTV core network for traffic from the multicast source. Advertisements are sent of the mapping to edge devices in another data center across the OTV network. A similar configuration is presented herein for a BAED for inbound multicast traffic to a data center.

Example Embodiments

Figure 1:
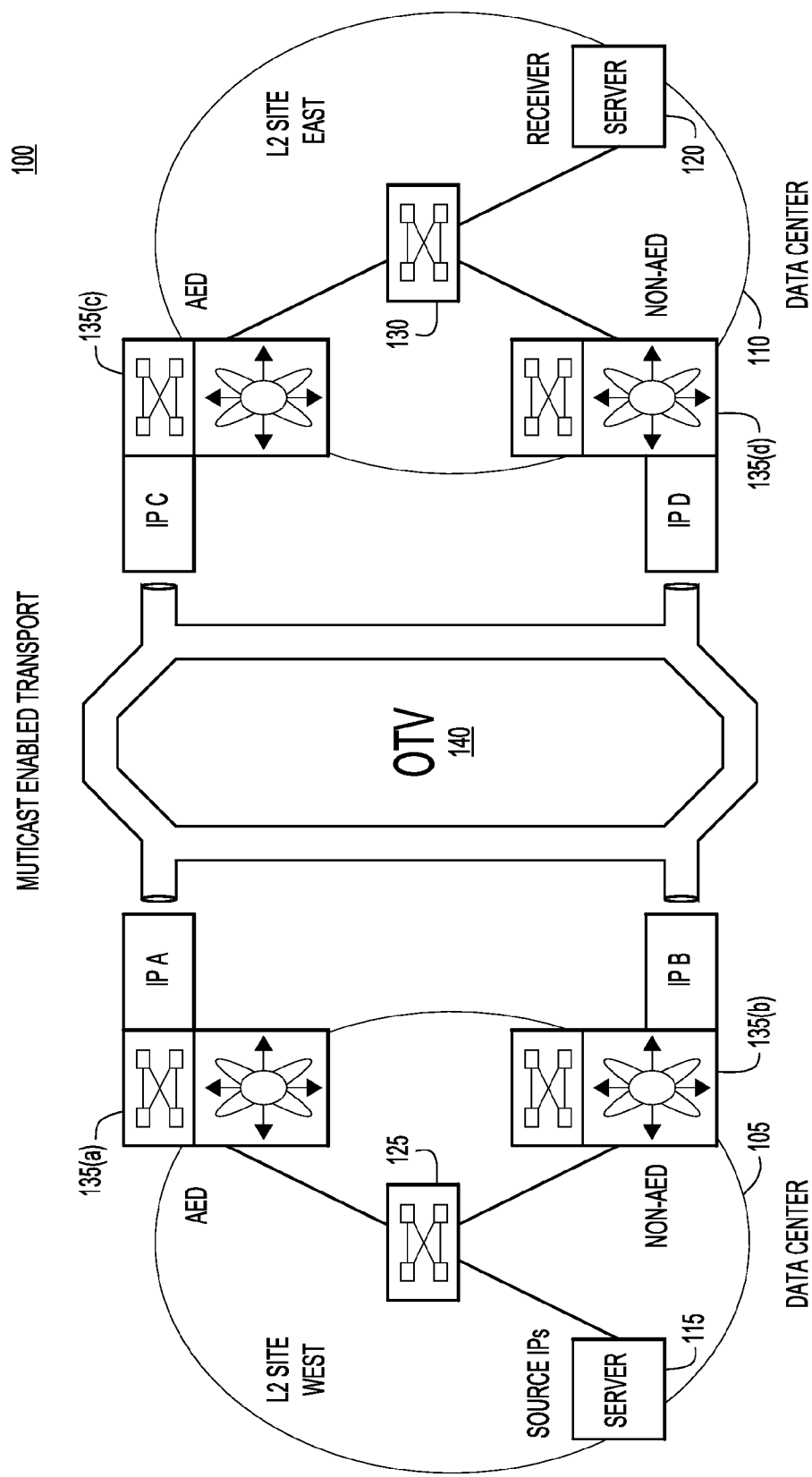
FIG. 1 is an example of a diagram of a network comprising multiple data center sites, where edge switches in a data center are configured to support an Overlay Transport Virtualization (OTV) protocol that extends layer 2 network connectivity to layer 3 network connectivity over Internet Protocol (IP) between edge switches at a plurality of data center sites.

Referring first to FIG. 1, a network environment 100 is shown comprising first and second data center sites 105, 110, each comprising one or more servers 115, 120, access switches 125, 130, and aggregation switches or edge switches 135(*a*), 135(*b*), 135(*c*), 135(*d*) that communicate across a layer 3 OTV ("core") network 140. Data center site 105 is referred to as a "West" site and data center site 110 is referred to as an "East" site. There may also be firewall devices connected to each edge switch at each data center site but for simplicity these firewall devices are not shown in FIG. 1. Furthermore, there may be other data center sites connected to the OTV network 140, such as a "South" site and a "North" site, etc., but for simplicity they are not shown in FIG. 1.

A plurality of access switches 125, 130 within a data center may communicate with each other within their respective layer 2 network using layer 2 protocols (for example, Ethernet), although for simplicity only one access switch per data center site is shown. The edge switches 135(a)-(d) communicate with the access switches 125, 130 at their respective data center using layer 2 network connectivity but communicate with devices in the OTV core network 140 which resides in an IP cloud using layer 3 network connectivity (for example, Transmission Control Protocol—Internet Protocol (TCP/IP)).

It is desirable to extend layer 2 domains over IP, as this allows multiple data centers to be treated as one logical data center or site. This is achieved using an Overlay Transport Virtualization (OTV) protocol. OTV is a "Media Access Control (MAC) in IP" technique for supporting layer 2 virtual private networks (VPNs) over any transport. The overlay nature of OTV allows it to work over any transport as long as this transport can forward IP packets. Any optimizations performed for IP in the transport will benefit the OTV encapsulated traffic. OTV can extend the layer 2 domains across geographically distant data centers by providing built-in filtering capabilities to localize the most common networking protocols (Spanning Tree Protocol, VLAN Trunking Protocol, and Hot Standby Router Protocol (HSRP), etc.) and prevent them from traversing the overlay network, therefore keeping protocol failures from propagating across data center sites. Unlike traditional layer 2 VPNs, which rely on layer 2 flooding to propagate MAC address reachability, OTV uses a protocol to proactively advertise the MAC addresses learned at each site. The protocol advertisement takes place in the background, with no configuration required by the network administrator.

OTV is referred to as an "overlay" method of virtualization versus traditional "in-the-network" type systems in which multiple routing and forwarding tables are maintained in every device between a source and a destination. With OTV, state is maintained at the network edges (edge switches at a data center, for example, edge switches 135(a)-135(d)), but is not required at other devices in a network site or in a core network. OTV operates at edge devices interposed between the data center sites and the OTV core network 140. The edge devices perform layer 2 learning and forwarding functions (similar to a traditional layer 2 switch) on their site-facing interfaces (internal data center interfaces) and perform IP-based virtualization functions on their OTV core network-facing interfaces, for which an overlay network is created. The dual functionality of the edge device provides the ability to connect together layer 2 networks, layer 3 networks, or hybrid (layer 2 and layer 3) networks.

Since Spanning Tree Protocols (STP) are maintained locally (i.e. within each given data center), data loops may result between two or more data centers connected via an OTV network. To avoid this problem, exactly one edge device may be designated to send and receive data packets across the OTV network for a given VLAN. This device is called the authoritative edge device (AED). A given edge device may act as the AED for one or more VLANs, but does not act as the AED for a second set of one or more VLANs, while another edge device may act as the AED for the second set of VLANs, etc. AEDs may be designated by an AED server, not shown in FIG. 1.

In the example of FIG. 1, edge switch 135(a) in data center site 105 is designated as the AED switch and switch 135(b) is the non-AED switch. Similarly, edge switch 135(c) is designated as the AED switch in data center 110 and switch 135(d) is the non-AED switch. Moreover, in the examples presented herein, AED 135(a) is referred to as a source AED because it is forwarding traffic from server 115 in data center 105 to server 120 in data center 110. For this reason, in this example, server 115 is also referred to as a source and server 120 is referred to as a receiver, AED 135(a) is referred to as a source AED and AED 135(c) is referred to as a receiver AED.

When source AED 135(a) forwards layer 2 traffic onto the layer 3 OTV core network 140, it encapsulates layer 2 packets (or frames) into layer 3 packets. Similarly, when receiver AED 135(c) receives one or more layer 3 packets, it decapsulates them into layer 2 packets before forwarding to the receiver 120. Encapsulation and decapsulation may be programmed into the hardware of each edge device.

When sending a source-specific multicast message for a given VLAN, source 115 may forward the multicast message to its AED 135(a). The multicast message is forwarded to the OTV core network 140, where it is duplicated for each recipient. The OTV core network 140 maintains one or more multicast trees, also known as source-specific multicast (SSM) trees, for each VLAN. The OTV core network 140 forwards the multicast message only to receivers that have requested to receive that multicast message stream. The group of receivers for a given source-specific multicast stream on a given VLAN for a multicast-enabled OTV core network 140 is known as a data group or core group. Multiple VLANs may also use the same data group and the same multicast tree. This helps reduce the number of multicast trees in the core.

Figure 2A:
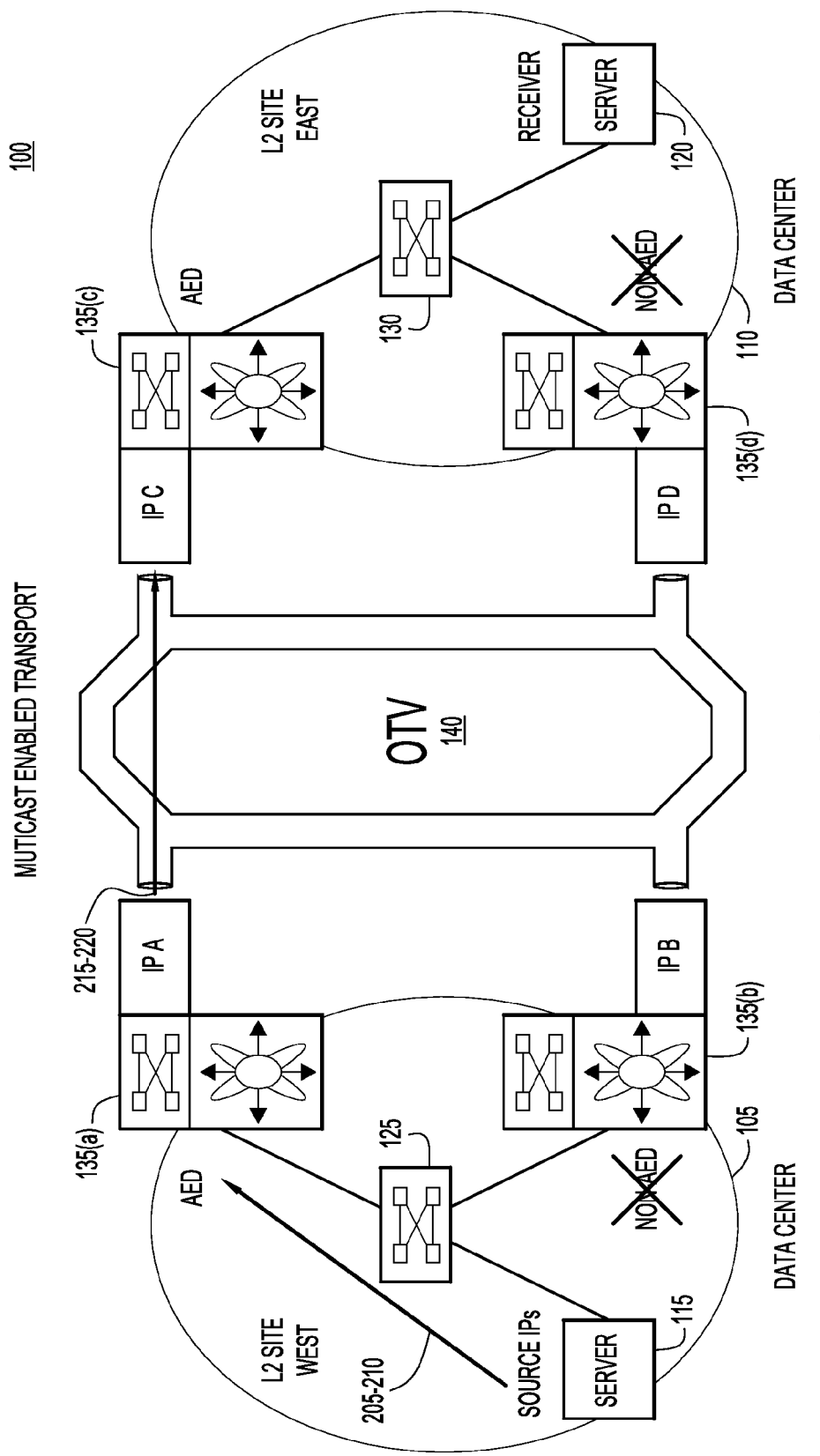
FIG. 2A is an example diagram for multicast source streaming to a data group.
Figure 2B:
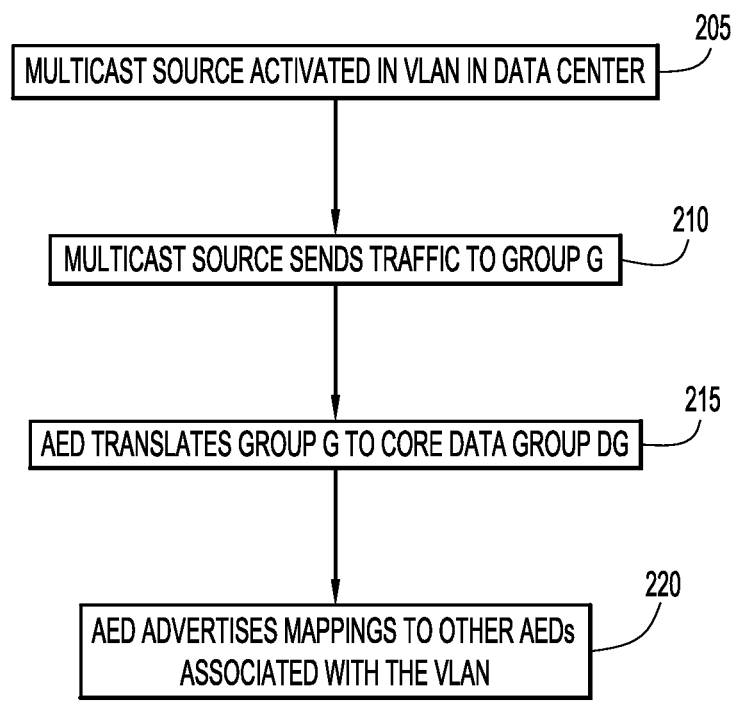
FIG. 2B is an example of a flow chart for multicast source streaming to a data group.

Reference is now made to FIGS. 2A and 2B, which provide an example of multicast source streaming of data to a group of recipients. At step 205, a multicast source is activated for a given VLAN in a data center, for example at source 115 in data center 105. At step 210, the multicast source 115 sends traffic to, for example, source (site) group G, which is a multicast address. Some of the recipients of the multicast message may, however, lie across the layer 3 OTV network 140. All edge devices in data center 105 may learn about the multicast source, but only the designated AED for the given VLAN creates a mapping between the source group G multicast address and the data group at step 215, for example, data group DG, over the OTV network, as shown below in Table 1 below. Members of the data group are maintained as a set of IP addresses in a multicast tree in the OTV core. At step 220, the AED advertises mappings to other AEDs in other data centers associated with the given VLAN. As an example, a mapping may contain a tuple of the VLAN identifier to which the source belongs and IP address of the source AED that created the mapping. For example, if the IP address of the source AED 135(a) is IP A, then the mapping would be [VLAN A, IP]→[IPA,DG].

TABLE 1

| Outgoing interface List on AED 135 (a) | |
| --- | --- |
| Group Mapping | Interface |
| G → DG | Overlay |

It is useful to distinguish between control plane messages sent to a control group and data messages sent to a data group. The mapping and advertising of steps 215 and 220 may take place in the control plane. Advertising is done to all edge devices across the OTV network listening on the control group, while multicast data packets, once the network is configured, are sent in the data plane to members of the data group. The purpose of the advertising is so that other edge devices connected to the OTV core network may be updated so that mappings are uniform across the system 100. This process of unifying topological information across network devices using a protocol is known as convergence. The control group is an identifier that is associated with all OTV edge devices for a given multicast overlay network. The control group is used to discover all remote sites in the control plane (using neighbor discovery packets, exchanging MAC address reachability, etc.). Control groups are specifically configured to transport the OTV protocol control packets across the data center sites. The data group corresponds to a source-specific multicast group—an identifier of all members that have subscribed to receive multicast data traffic from a given source.

Figure 3A:
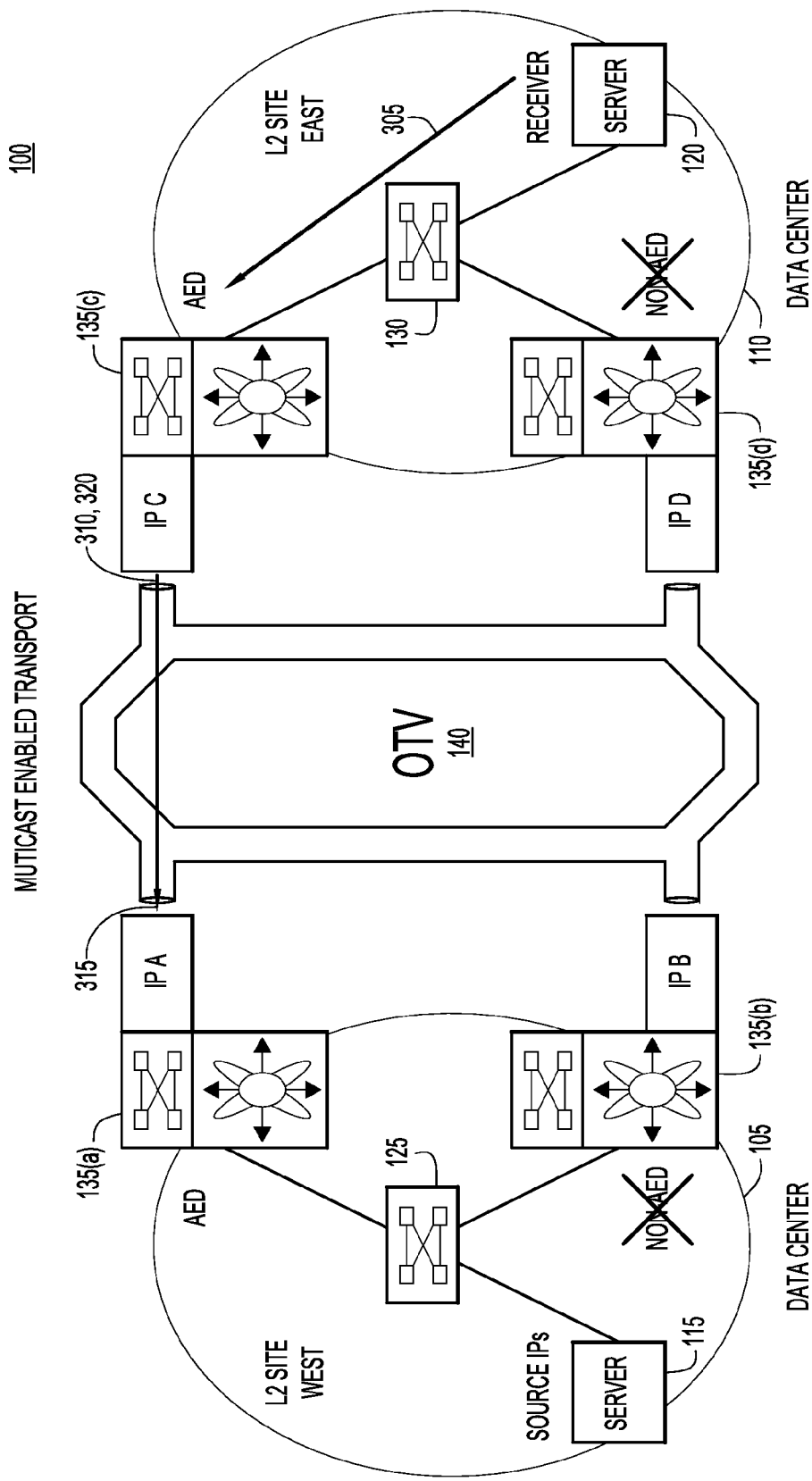
FIG. 3A is an example diagram for a multicast receiver joining a multicast data group.
Figure 3B:
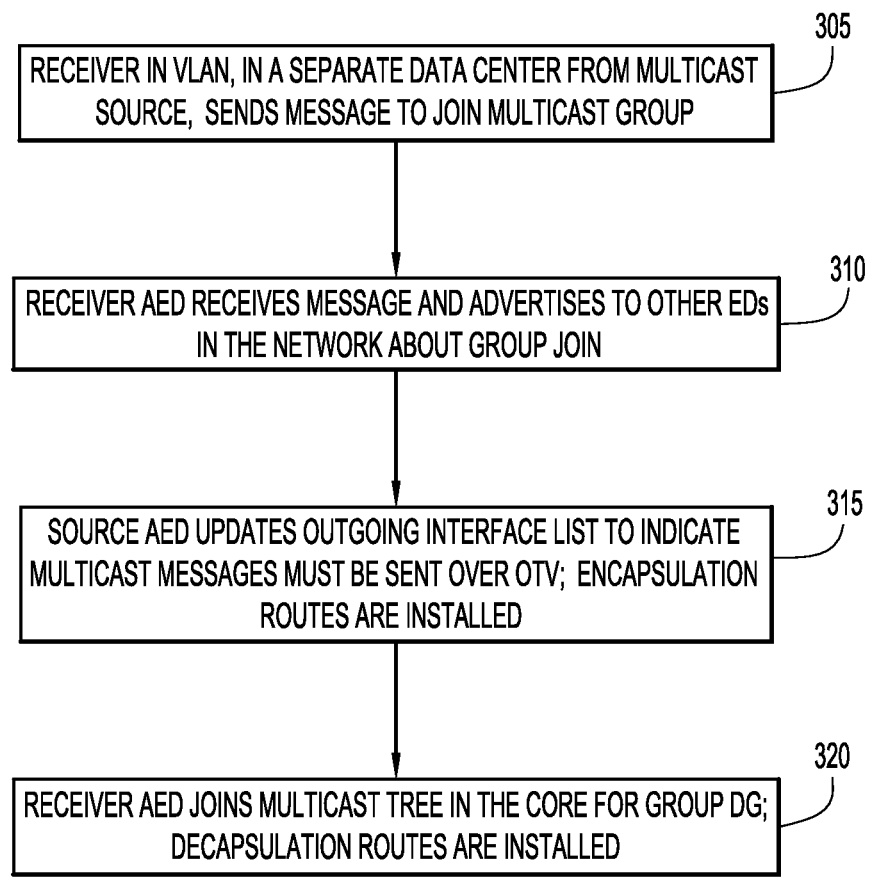
FIG. 3B is an example of flow chart for a multicast receiver joining a multicast data group.

As mentioned previously, potential multicast recipients subscribe or join to receive multicast messages. This may be done after the sender AED has advertised site group to data group mapping in step 220. This process is shown in FIGS. 3A and 3B. At step 305 a receiver in the same VLAN as the multicast source sends a message to join the multicast group. For example, receiver 120 may send an Internet Group Management Protocol (IGMP) message to join group G. The receiver AED 135(*c*) may snoop the IGMP message and determine that a receiver in the same VLAN as the multicast source is subscribing to the multicast group. At step 310, the receiver AED advertises by protocol message to other edge devices (EDs) in the OTV network about the group join. At step 315, source AED 135(*a*) updates its outgoing interfaces list (OIL) with the information that source group G's multicast traffic also needs to be sent across the OTV core network, as shown in Table 1 above. AED 135(*a*) may also install encapsulation routes in hardware so that layer 2 packets will be encapsulated in layer 3 packets. The receiver AED 135(*c*) also uses the mapping advertised by source AED 135(*a*) at step 220 to join the multicast tree maintained in the OTV core network for core group DG. Decapsulation routes are installed in the hardware of AED 135(*c*), in order to convert incoming layer 3 multicast packets into layer 2 packets.

Figure 4A:
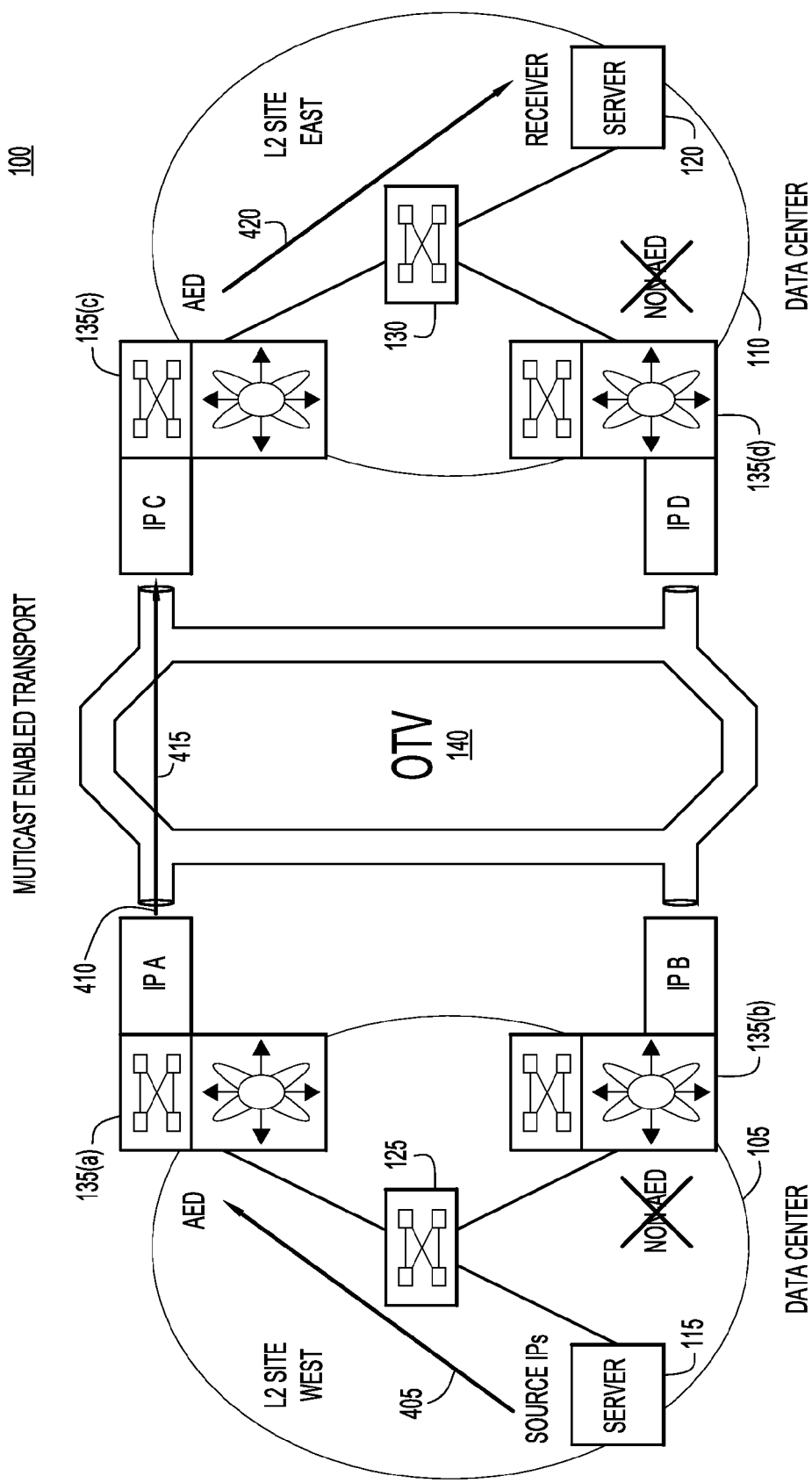
FIG. 4A is an example diagram of multicast data traffic delivery across an OTV core network.
Figure 4B:
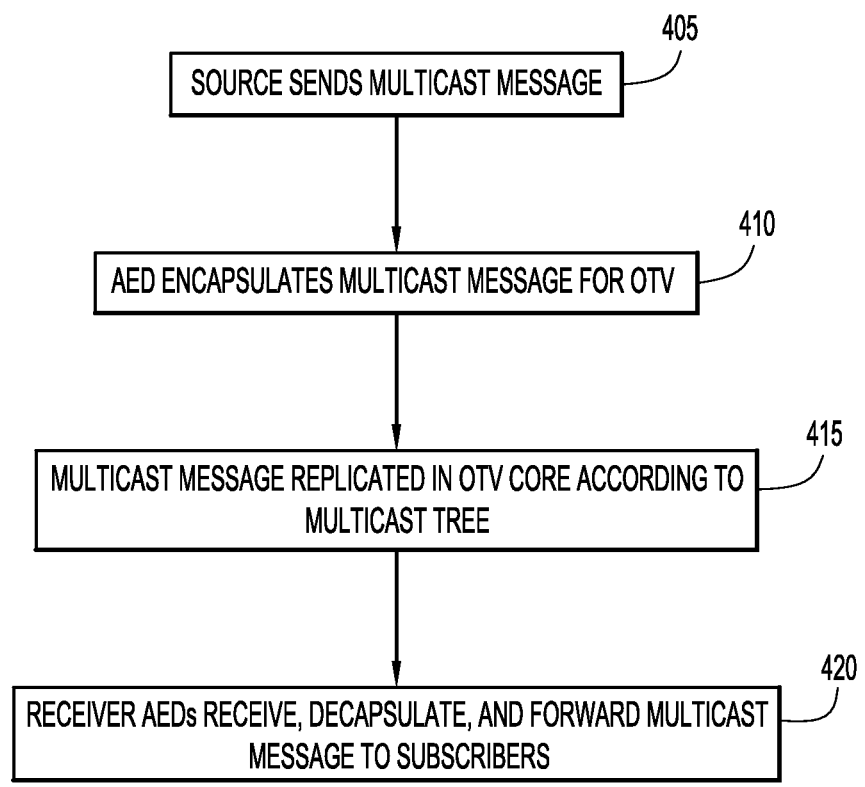
FIG. 4B is an example of a flow chart for multicast data traffic delivery across an OTV core network.

FIGS. 4A and 4B illustrate multicast data traffic delivery on the data plane, now that the relevant AED devices have converged on the control plane. At step 405, source 115 sends a multicast message in data center 105. AED 135(*a*) receives the message and determines from its OIL that the multicast message needs to be sent onto the OTV core network 140. At step 410, AED 135(*a*) encapsulates the one or more multicast frames. The source address in the layer 3 header may be set to the outgoing IP address of the AED 135(*a*), and the destination is set to the data core group name, in this case DG. At step 415, the multicast message is replicated in the OTV core network 140 by referencing the associated multicast tree to determine the IP addresses associated with each recipient in the core group DG. In this case, at step 420, AED 135(*c*) would receive the multicast message, decapsulate it, and forward it to receiver 120. Thus, in this method of multicast message transmission and distribution for a given VLAN, the non-AED devices, in this case devices 135(*b*) and 135(*d*), do not play any role.

Figure 5A:
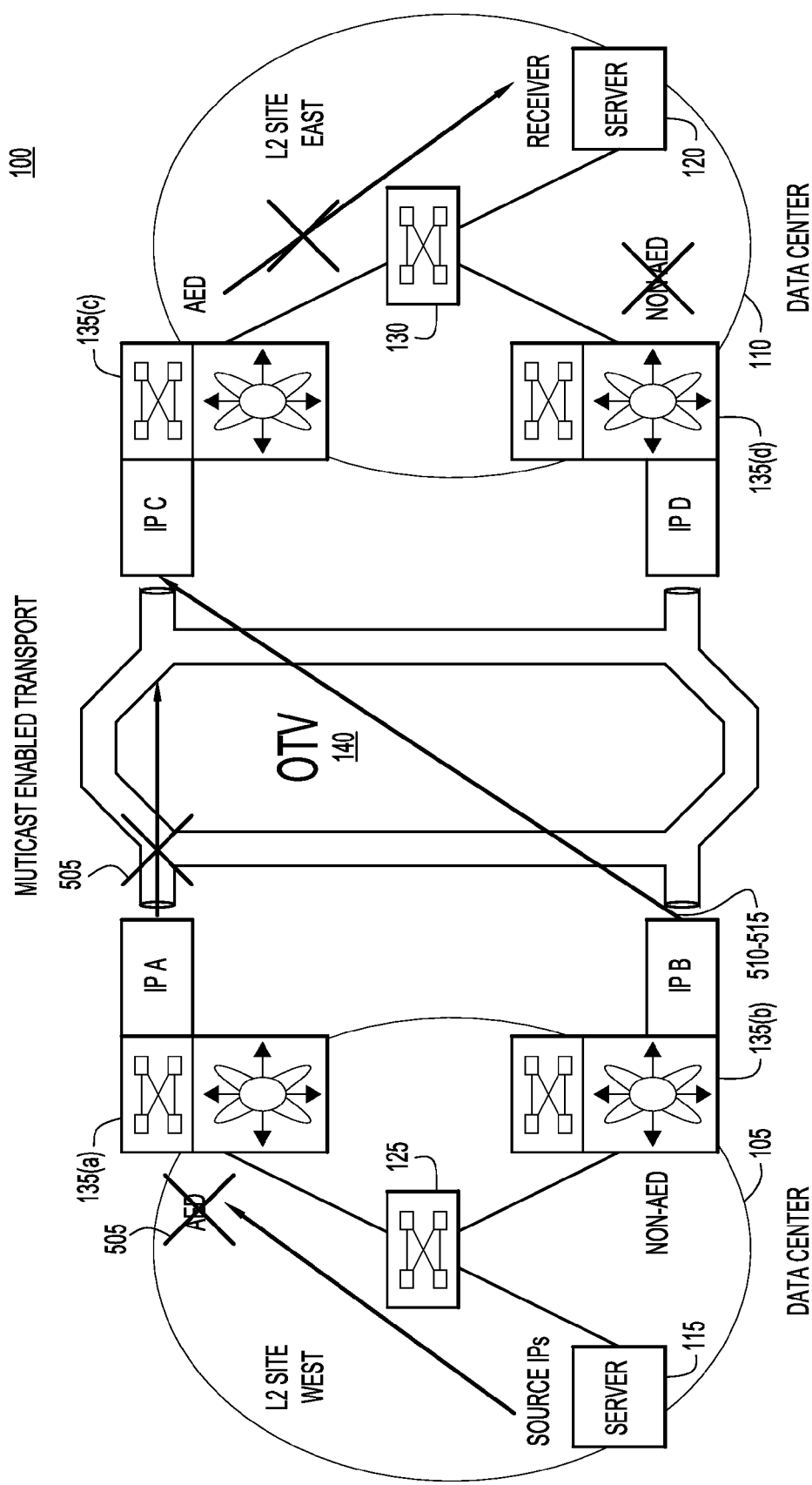
FIG. 5A is an example diagram of an AED failure causing a data traffic outage for one or more VLANs associated with the AED.
Figure 5B:
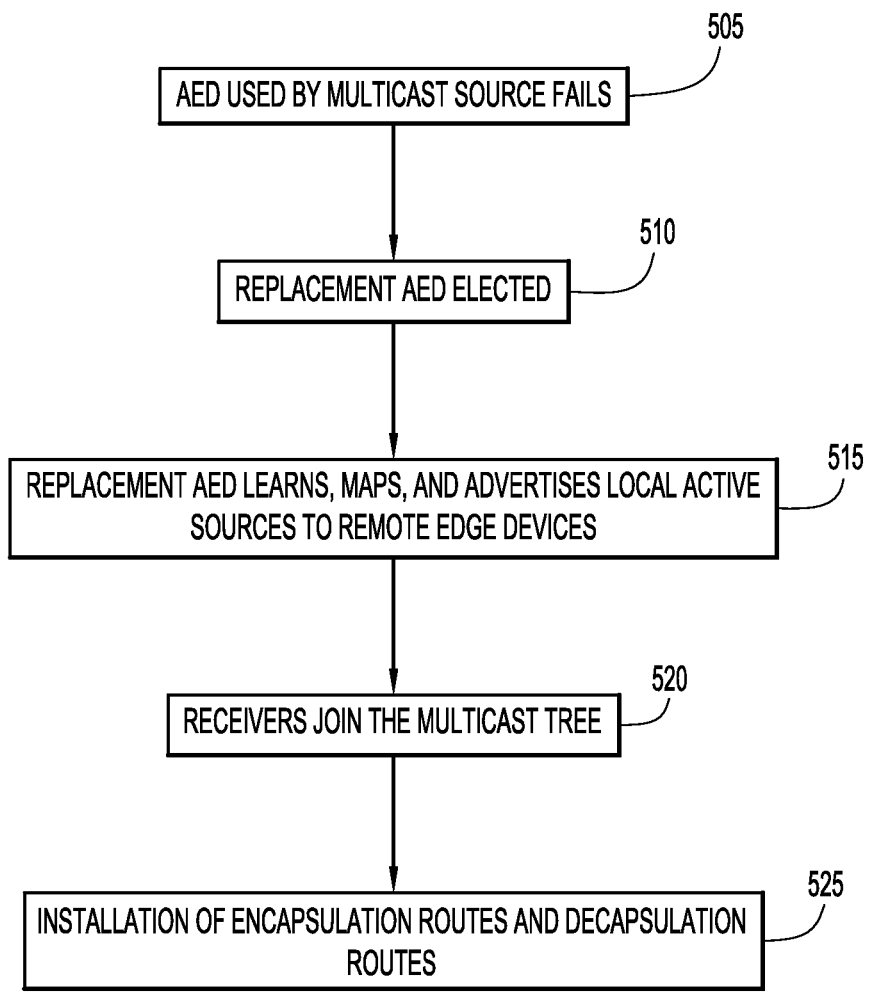
FIG. 5B is an example of a flow chart when an AED failure causes data traffic outage for one or more VLANs associated with the AED.

One problem with this approach is shown in FIGS. 5A and 5B. If the sender AED for one or more VLANs were to fail, the AED server would elect another edge device to become the new AED. Delays associated with AED failure can be significant and non-deterministic. At step 505, the AED 135(*a*), for example, fails causing a traffic outage. At 510, the AED server may designate element 135(*b*) as the replacement AED. The replacement AED has to re-learn the source group, and re-map the source group to a core data group. The replacement AED has to advertise the local active source mappings to remote edge devices at step 515. This allows remote receivers to subscribe to the multicast group and join the associated multicast tree in the OTV core network. The multicast tree may be newly created once the new AED is elected. One or more receiver AEDs, for example AED 135(*c*), may join the advertised multicast tree to draw multicast traffic at step 520. At step 525, encapsulation routes may also be installed in hardware at the sender AED 135(*a*), and decapsulation routes installed at receiver AED 135(*c*).

The process is similar if there is an AED failover at a receiver site, for example a failure of AED 135(*c*). The failed AED would stop receiving and/or decapsulating traffic into the receiver site, causing a traffic outage. The AED server may elect a new edge device, such as device 135(*d*), to act as the new AED. The new AED would need to discover receivers of multicast messages, and then join the specific multicast tree advertised by the multicast source AED. In addition, the new receiver AED would have to install the necessary layer 3 packet decapsulation routes to stream traffic into the site.

Whether the sending or receiving AED device fails, all of these steps may cause perceptible delays as the replacement AED is converged, and in the interim there may be a complete traffic loss for the VLANs using the failed AED. As the size of the network is scaled, the delays can be significant and non-deterministic.

Figure 6A:
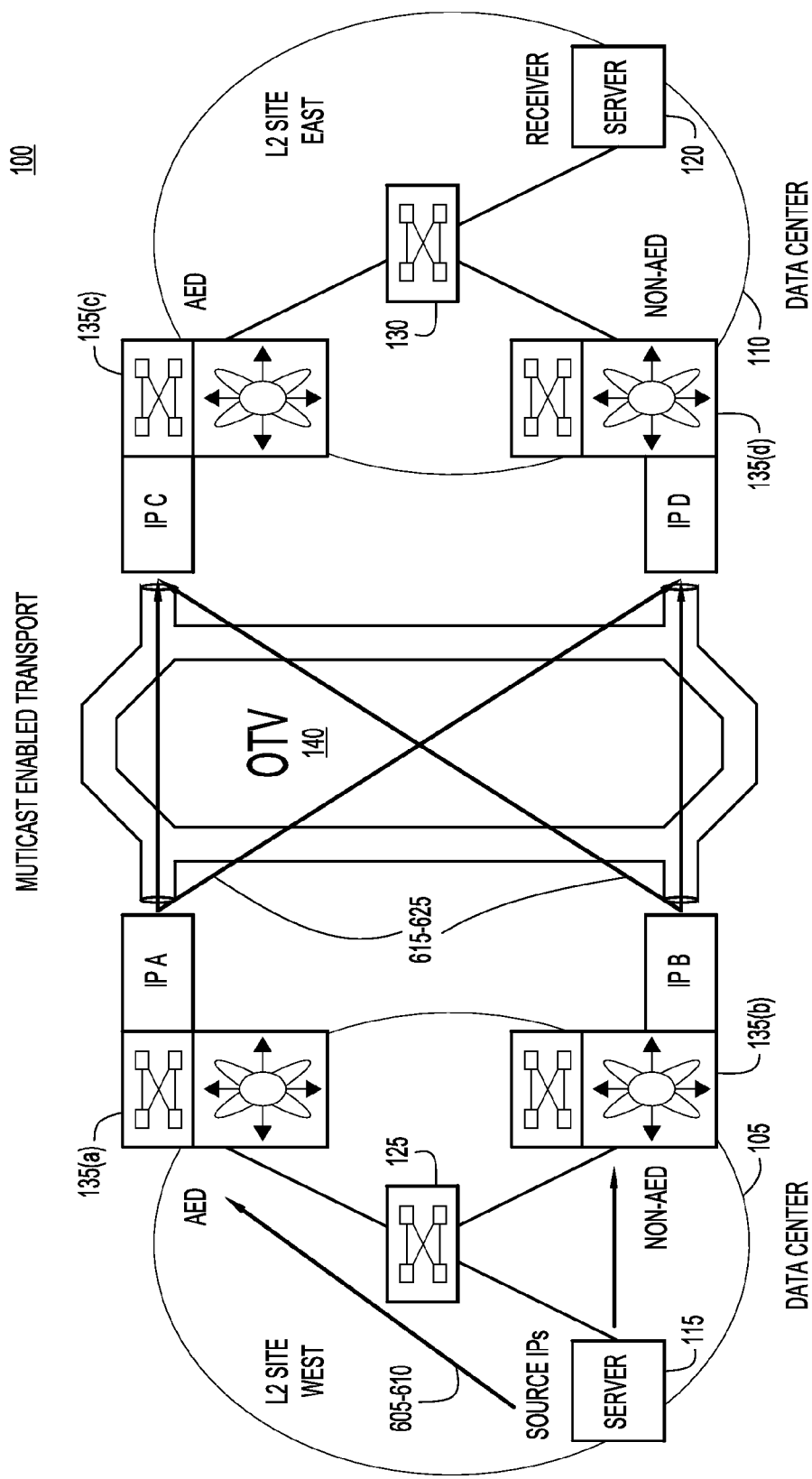
FIG. 6A is an example diagram for proactive learning of multicast streaming by a source AED and backup source AED (BAED).
Figure 6B:
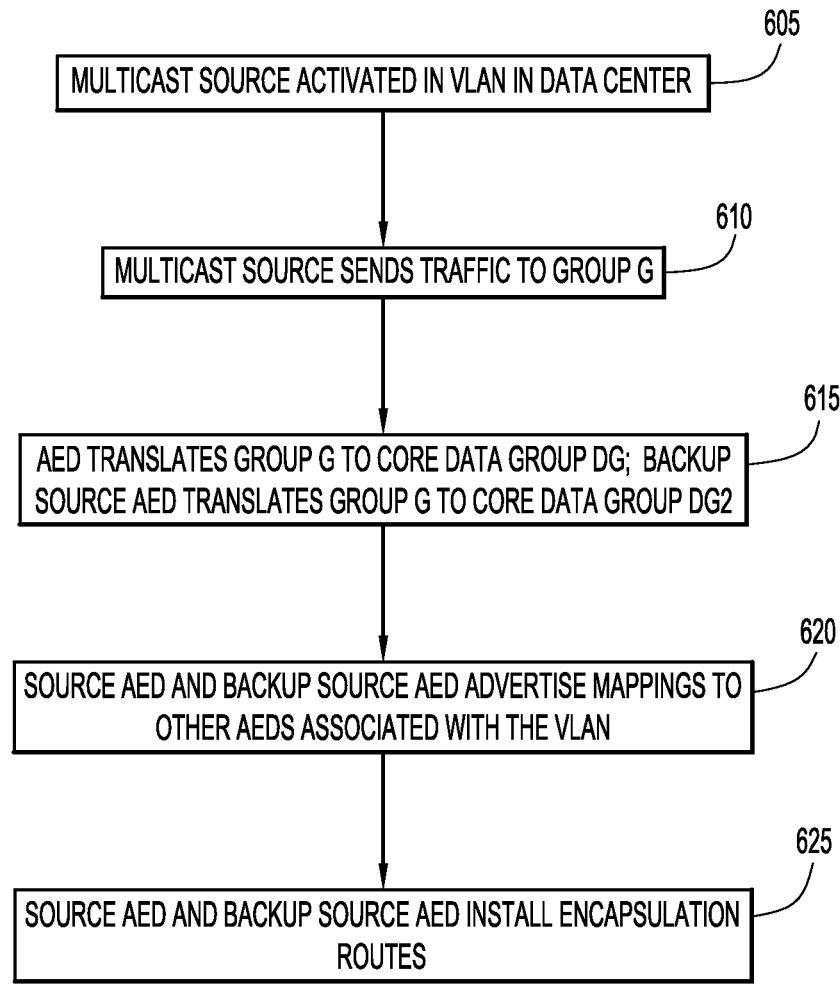
FIG. 6B is an example of flow chart for proactive learning of multicast streaming by a source AED and backup source AED (BAED).

A solution is shown in FIGS. 6A and 6B, which depict proactive learning of a backup AED at the source site. An AED server or some other device may elect/designate both an AED and a backup AED, where the backup AED may be another OTV-enabled edge device such as device 135(*b*). At step 605, a multicast source is activated for a VLAN, e.g., VLAN A, in a data center. At step 610, the multicast source sends traffic to the site group G. Both the source AED 135(*a*) and backup source AED 135(*b*) receive this traffic, and create their own independent source group to data group mappings for each active source at step 615. For example, the source AED 135(*a*) may create a mapping from source group G to core group DG1, while the backup source AED 135(*b*) may create a mapping from source group G to core group DG2, as shown below in Table 2. Both AED 135(*a*) and non-AED 135(*b*) similarly create separate multicast trees to be maintained in the OTV core network 140. At step 615, in the control plane both the AED and backup AED advertise their mappings to edge devices in other data centers. Edge devices associated with the VLAN may respond with join requests from one or more receivers, and encapsulation routes are installed at both the AED and backup AED. Although encapsulation routes are installed at the backup AED 135(*b*), actual multicast encapsulation and forwarding are disabled in the backup AED until there is a failover causing it to acquire AED status. Thus, with the exception of the disabled encapsulation and forwarding, the backup source AED 135(*b*) may behave identically and in parallel with source AED 135(*a*). As a result, the backup source AED is ready to send traffic on its mapped data group DG2 by a simple switch in the data forwarding plane as soon as the failover of the source AED is detected.

TABLE 2

Mapping in Site West 105

| | Site Group | Core Group |
|---|---|---|
| Source AED | G | DG1 |
| Backup Source AED | G | DG2 |

Both the source AED 135(*a*) and backup source AED 135(*b*) may periodically send dummy packets to maintain their multicast trees in the OTV core. This is to ensure that, for each advertised data group, the associated multicast tree is maintained in the core even if multicast traffic is not being sent on the channel. This might happen, for example, if no traffic is being streamed to a data group because the edge device is a backup AED, or if there are no receivers on any of the VLANs mapped to the data group.

Figure 7A:
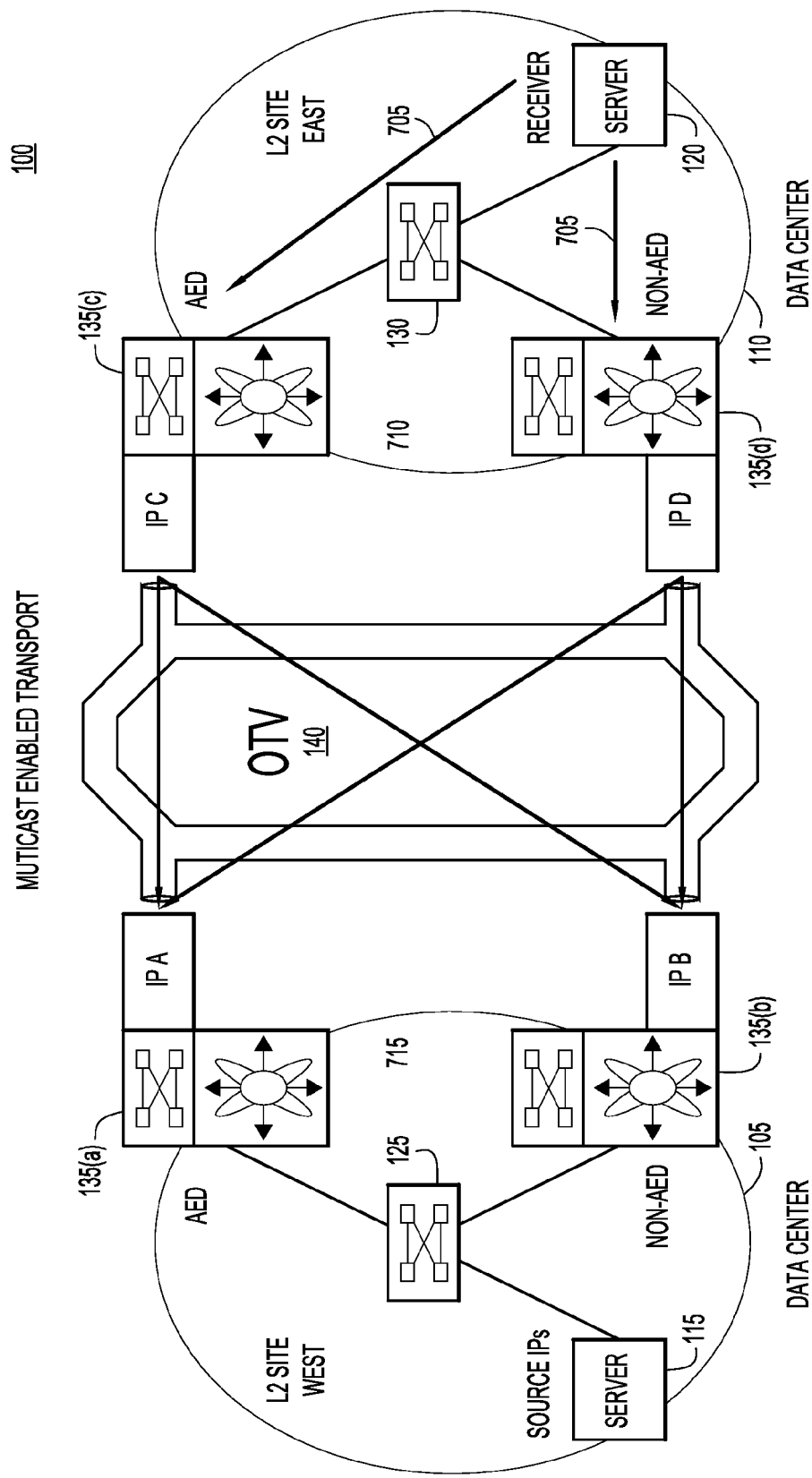
FIG. 7A is an example diagram for proactive learning of multicast streaming by a receiver AED and receiver BAED.
Figure 7B:
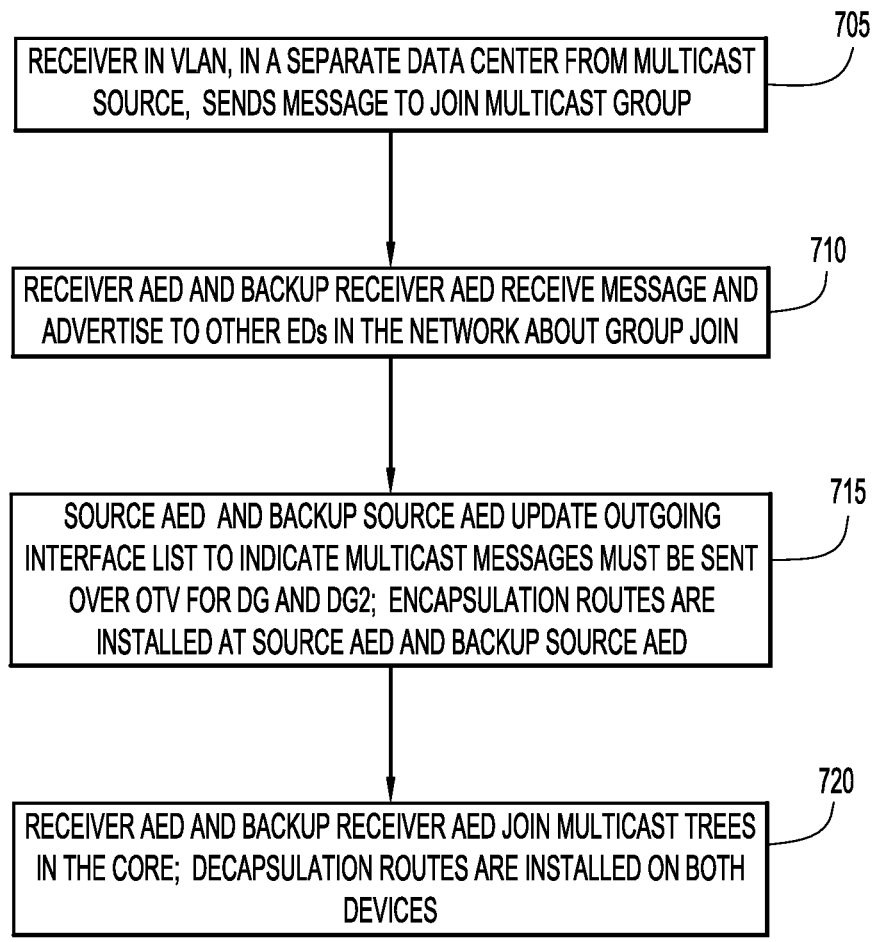
FIG. 7B is an example of a flow chart for proactive learning of multicast streaming by a receiver AED and receiver BAED.

Reference is now made to FIGS. 7A and 7B, which illustrate similar functionality on the receiver data center site. At the receiver data center site, receiver AED 135(*c*) may also have a backup AED, for example AED 135(*d*). At step 705, the receiver AED and backup receiver AED both receive the messages advertising the mappings for core data groups DG1 and DG2 from the sender AED and backup sender AED, respectively. One or more receivers in the same VLAN as the data groups DG1 and DG2, for example receiver 120, send a message, for example an IGMP message, to join site group G. The IGMP message may be received (snooped) by both the receiver AED and the backup receiver AED at step 710. Both the receiver AED and backup receiver AED subscribe to both the sender AED and backup sender AED. Thus, both the receiver AED and the backup AED join both multicast trees for data groups DG1 and DG2 in the OTV core network. At step 715, the sender AED and backup sender AED update their outgoing interfaces lists to indicate that multicast messages are to be sent over the OTV core network, as shown below in Table 3. Encapsulation routes may also be installed in hardware on the source AED and backup source AED. Further, at step 720 both the receiver AED and backup receiver AED install decapsulation routes, although in the backup AED decapsulation and forwarding are disabled. Thus, both the receiver AED and backup receiver AED may draw multicast traffic from both the sender AED and backup sender AED, although traffic may not be forwarded from the backup sender AED unless there is a failover.

TABLE 3

Outgoing Interface List in Site West 105

| Group | Interface |
|---|---|
| AED: G → DG1 | Overlay |
| Backup-AED: G → DG2 | Overlay |

Figure 8A:
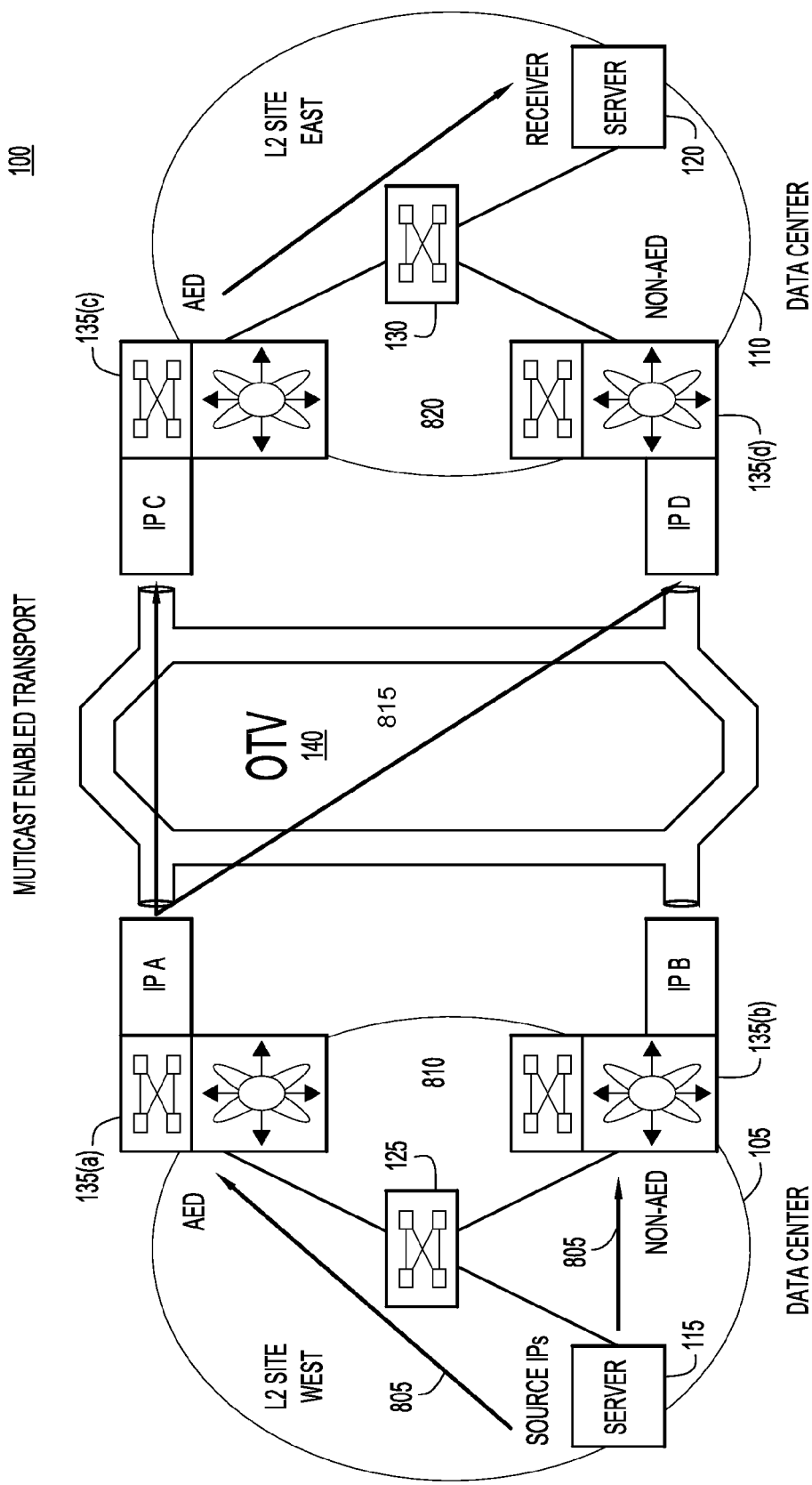
FIG. 8A is an example diagram for multicast data traffic delivery across an OTV network with proactive source learning.
Figure 8B:
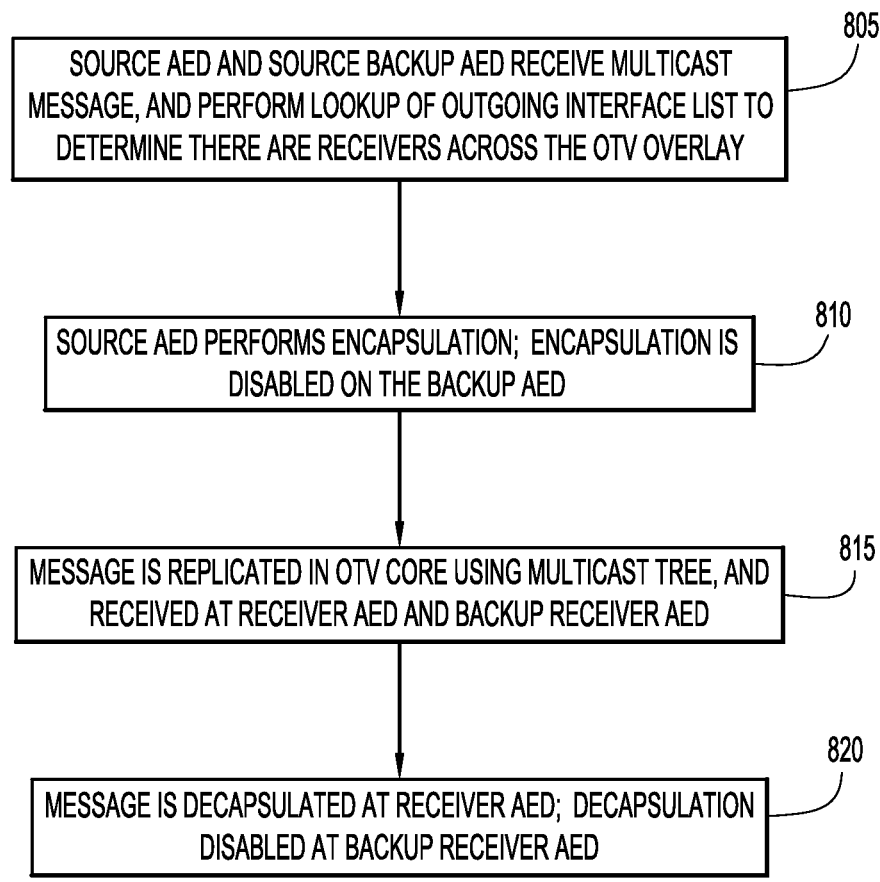
FIG. 8B is an example of a flow chart for multicast data traffic delivery across an OTV network with proactive source learning.

FIGS. 8A and 8B show an example of the delivery of a multicast stream in the data forwarding plane. Similar to FIGS. 4A and 4B, the source AED and receiver AED receive and forward multicast transmissions. However, the backup AEDs are ready to take over in the event of an AED failover. At step 805, a source sends a multicast message that is received by the source AED and backup source AED. Each may check their OIL to determine if there are any receivers across the OTV overlay network. As shown at step 810, the source AED may then perform encapsulation of the multicast message, and forward it onto the OTV core network, while encapsulation at the backup source AED may be disabled. The source address in the layer 3 data packet header may be set to the IP address of the source AED, while the destination may be the data group DG. At step 815, the multicast message is received at the multicast tree for data group DG in the OTV core network and replicated as necessary. At step 820, the multicast messages are then forwarded to the receiver AED and backup receiver AED, although only the receiver performs decapsulation and forwarding to the receiver 120.

Figure 9A:
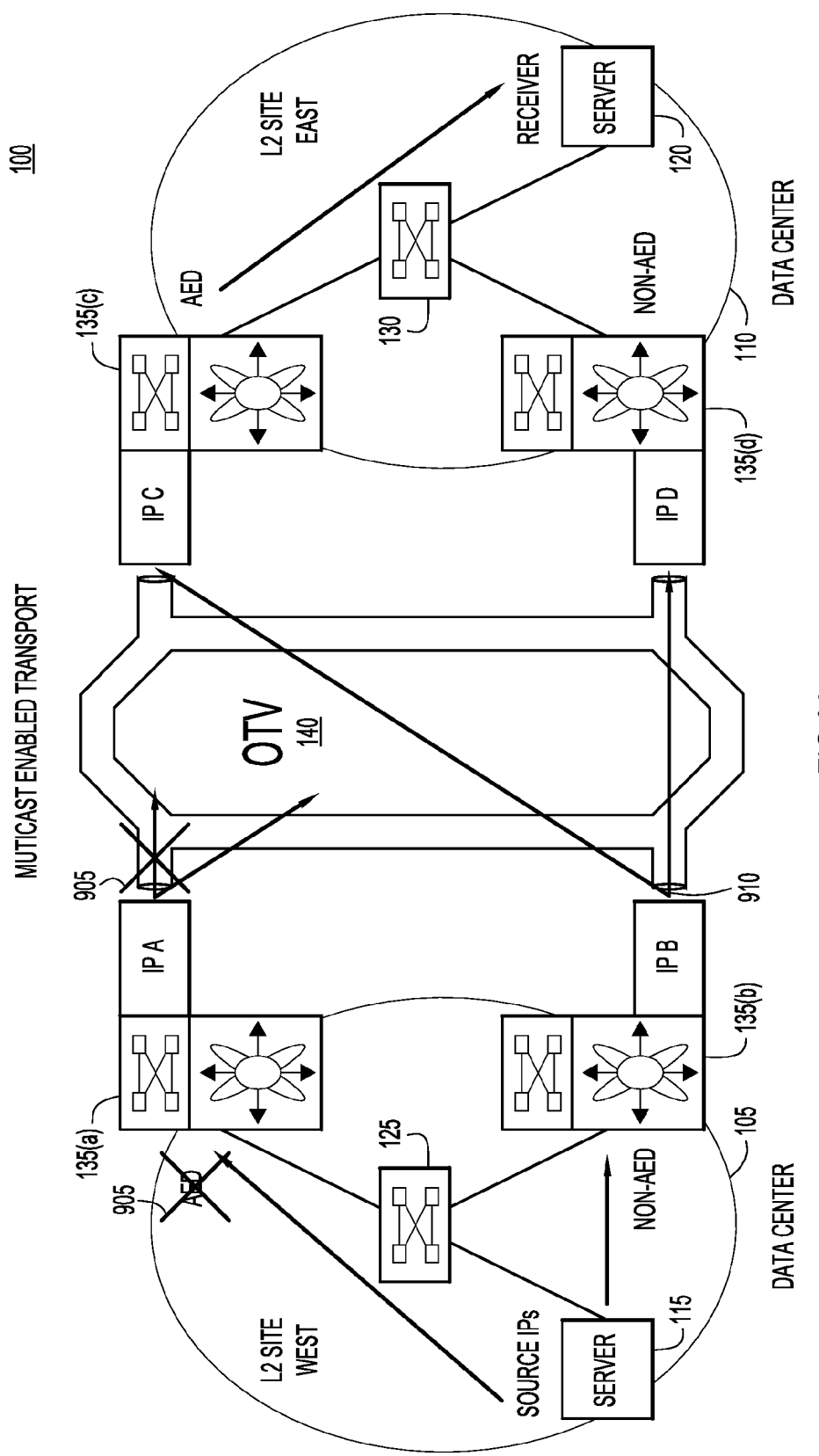
FIG. 9A is an example of a diagram when an AED failure causes a source BAED to enable encapsulation and forwarding.
Figure 9B:
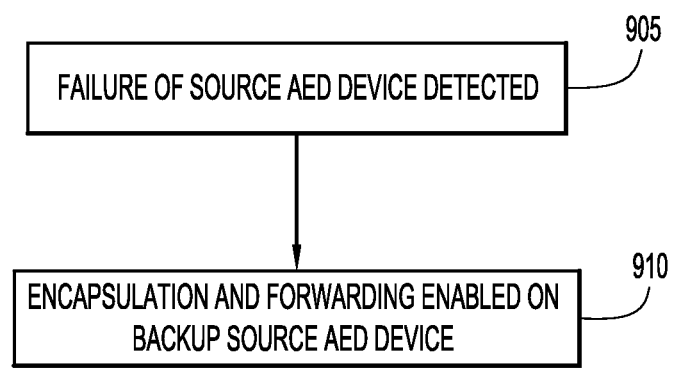
FIG. 9B is an example of a flow chart when an AED failure causes a source BAED to enable encapsulation and forwarding.

Reference is now made to FIGS. 9A and 9B, which show steps in the event of a failover of the source AED, for example, AED 135(*a*). At step 905, a failover of the source AED may be detected in the control plane. There are many methods of detecting a failover. For example, HELLO packets may be lost or a downed link may be detected, all of which are consistent with techniques presented herein. Encapsulation routes have already been installed in hardware on the backup source AED device. The control plane enables encapsulation and forwarding, resulting in the backup source AED sending multicast messages to core data group DG2 almost immediately, as shown at step 910. Furthermore, the backup source AED 135(*b*) now acts as the AED for all VLANs that are also associated with the source AED 135(*a*). The backup source AED no longer needs to go through time-consuming source learning, group mapping, and advertising phases. When encapsulating, the layer 3 packet may contain the IP address of the AED device 135(*b*) as the source address in the header. The destination address in the header may be the data group DG2. Since the multicast tree for DG2 has already been built, and possibly maintained by periodic dummy packets, the multicast tree can begin replicating and forwarding multicast messages across the transport infrastructure to all remote sites with subscribers of the site group G. Since both the receiver AED 135(*c*) and backup receiver AED 135(*d*) have joined the multicast tree for data group DG2, both receive packets. However, if the receiver AED 135(*c*) is functioning normally, backup receiver AED 135(*d*) will not decapsulate and forward the multicast messages.

Figure 10A:
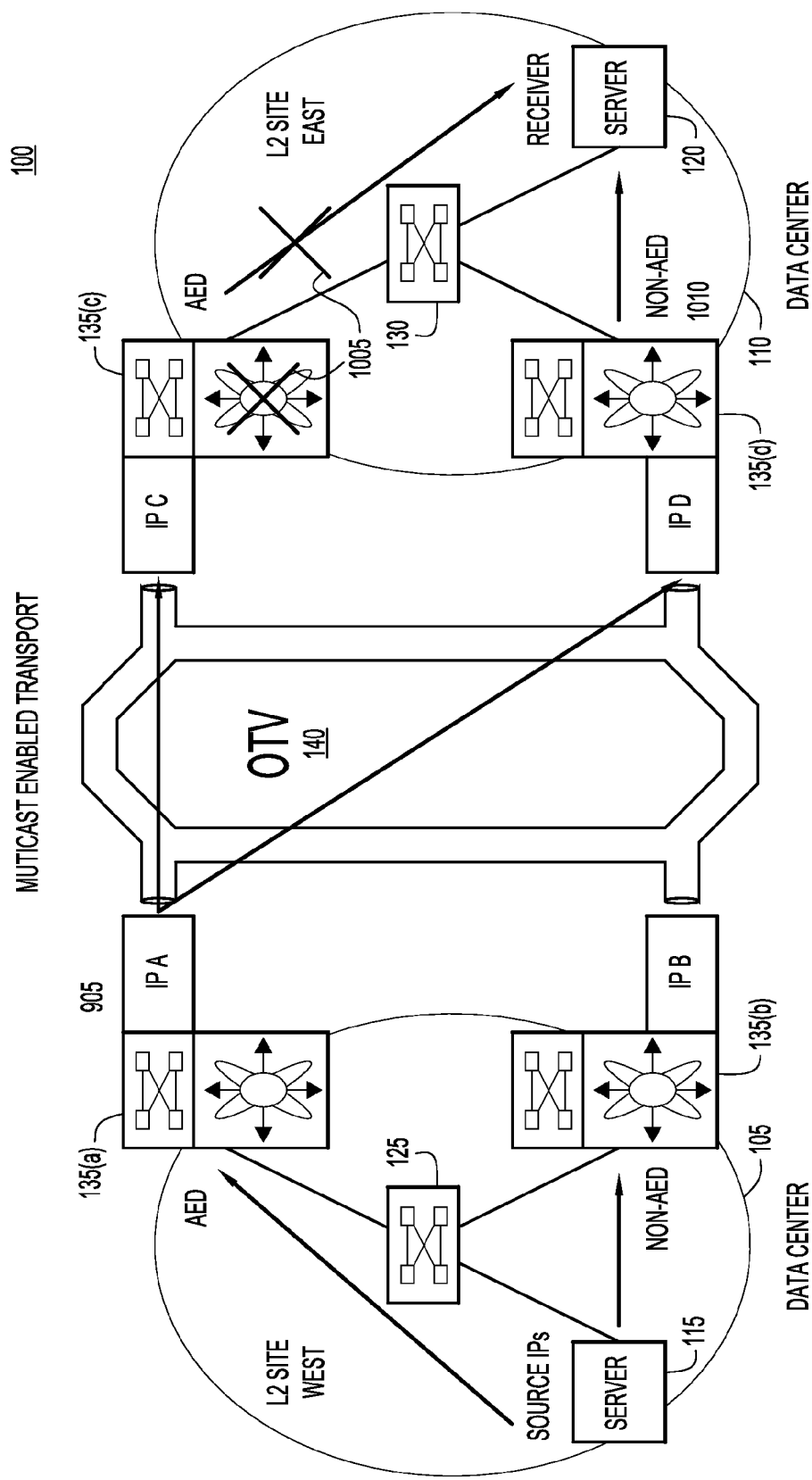
FIG. 10A is an example of a diagram when an AED failure causes a receiver BAED to enable decapsulation and forwarding.
Figure 10B:
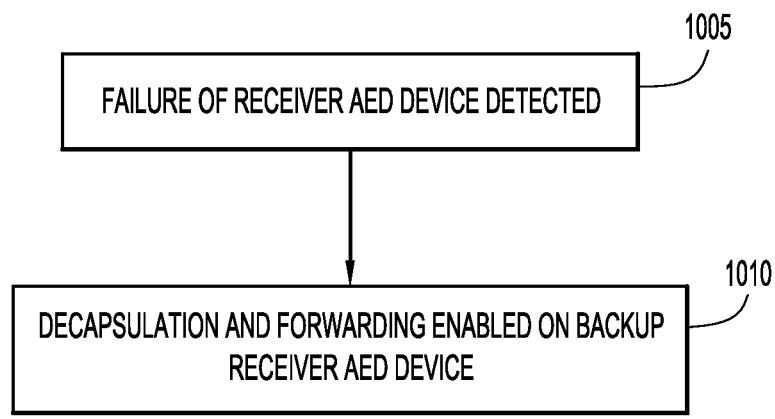
FIG. 10B is an example of a flow chart when an AED failure causes a receiver BAED to enable decapsulation and forwarding.

Reference is now made to FIGS. 10A and 10B, which show steps in the event of a failover of the receiver AED, for example receiver AED 135(*c*). At step 1005, a failover of the receiver AED device may be detected in the control plane, using methods discussed previously, for example. In response, at step 1010 decapsulation and forwarding is enabled on the backup receiver AED in the data forwarding plane. The backup receiver AED had subscribed to both the data groups DG1 and DG2, and already receives multicast packets from whichever multicast tree is associated with the active source AED. This allows an almost immediately resumption in traffic flow for VLANs associated with the receiver AED, including for receivers of the site group G. No joining of multicast trees or installation of decapsulation routes is required, since these steps were performed prior to the receiver AED failover. Activating decapsulation and forwarding may be performed primarily in software, although decapsulation routes may be installed in hardware on the AED devices.

Figure 11:
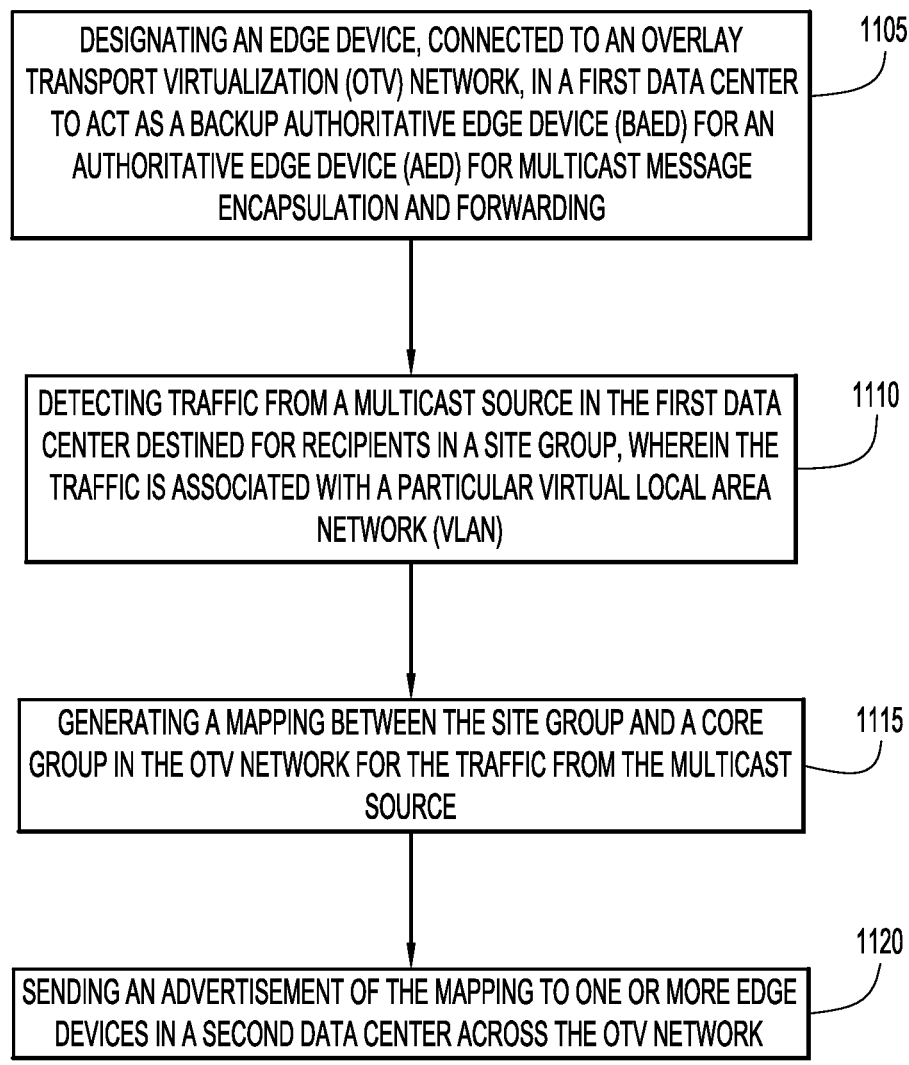
FIG. 11 is a flow chart depicting operations performed by an edge switch in a first data center for which data is sourced, according to techniques presented herein.

FIG. 11 shows an example of a flow chart depicting operations performed at a source side, according to techniques presented herein. This flow chart summarizes the operations that are performed at multicast source side. At step 1105, an edge device, connected to an OTV network, in a first data center is designated to act as a backup authoritative edge device (BAED) for an AED for multicast message encapsulation and forwarding. Traffic is detected from a multicast source in the first data center destined for recipients in a site group at step 1110, wherein the traffic is associated with a particular VLAN. At step 1115, a mapping is generated between the site group and a core data group in the OTV network for the traffic from the multicast source. At step 1120, an advertisement of the mapping is sent to one or more edge devices in a second data center across the OTV network.

Figure 12:
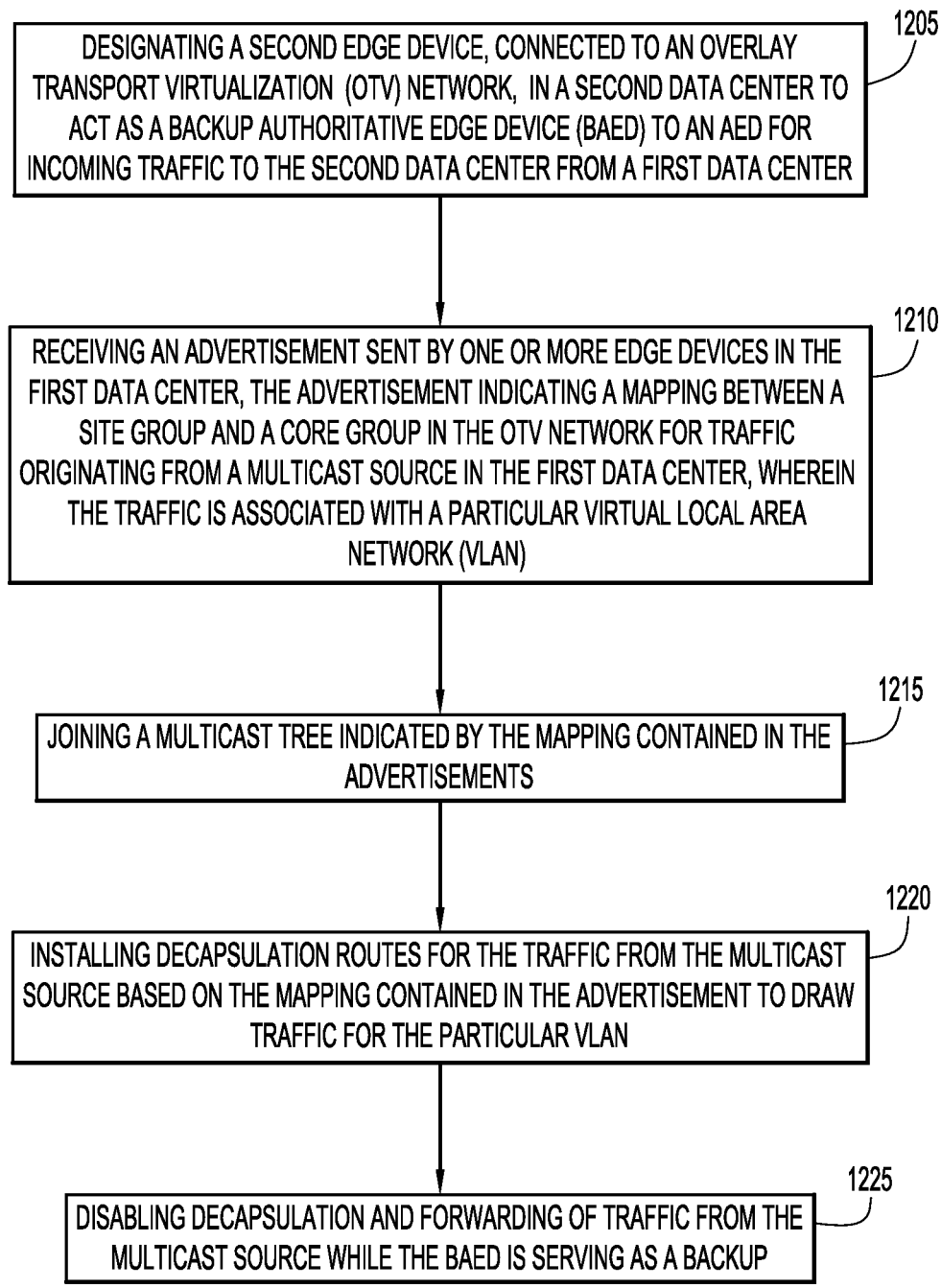
FIG. 12 is a flow chart depicting operations performed by an edge switch in a second data center for which data is received according to techniques presented herein.

FIG. 12 shows an example of a flow chart depicting operations performed according to techniques presented herein. This flow chart summarizes the operations that are performed at a receiver side. At step 1205, a second edge device, connected to an overlay transport virtualization (OTV) network, may be designated in a second data center to act as a backup authoritative edge device (BAED) to an AED for incoming traffic to the second data center from a first data center. At step 1210, an advertisement is received that was sent by one or more edge devices in the first data center, the advertisement indicating a mapping between a site group and a core group in the OTV network for traffic originating from a multicast source in the first data center. The traffic may be associated with a particular VLAN. A multicast tree may also be joined at step 1215, the multicast tree being indicated by the mapping contained in the advertisements. At step 1220, decapsulation routes may also be installed for the traffic from the multicast source based on the mapping contained in the advertisement to draw traffic for the particular VLAN. At step 1225, decapsulation and forwarding of traffic may also be disabled from the multicast source while the BAED is serving as a backup.

Figure 13:
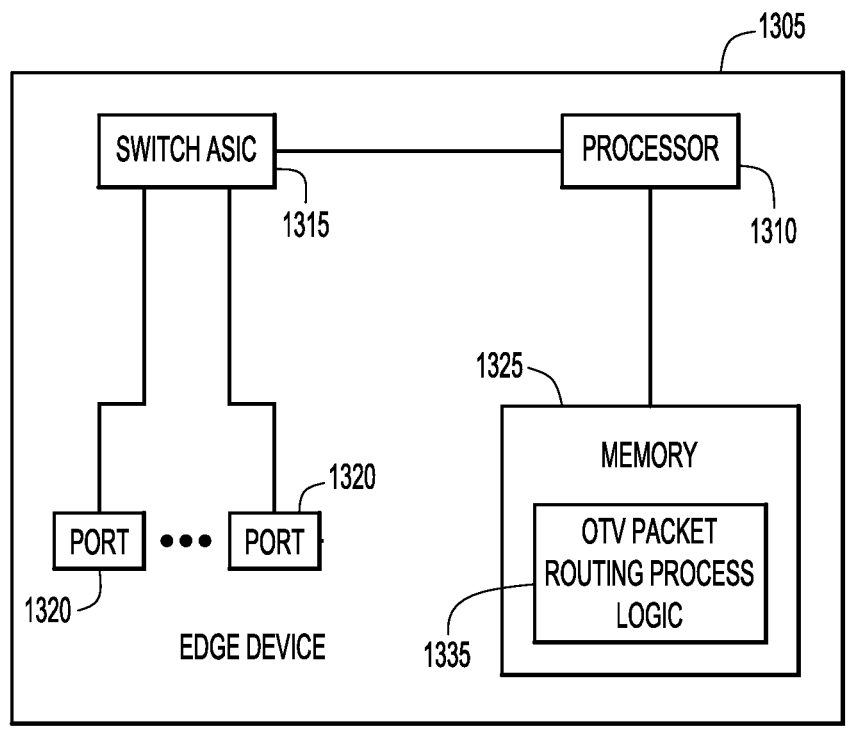
FIG. 13 is an example block diagram depicting an edge switch configured to perform operations according to techniques presented herein.

Reference is now made to FIG. 13 for a description of an edge switch, for example switch 135(*a*), that is configured to interact with an OTV core network in accordance with the techniques presented herein. The edge switch 1305 comprises a processor 1310, switch hardware 1315 comprising one or more application specific integrated circuits (ASICs), one or more ports 1320 and a memory 1325. The processor 1310 may be a microprocessor or microcontroller or other similar data processor. The switch hardware 1315 comprises digital logic and other circuitry configured to perform the switching/forwarding operations in the layer 2 network at the data center for the edge switch and in the layer 3 network (for e.g., OTV in the IP cloud 140). The memory 1325 may comprise read only memory (ROM), random access memory (RAM), magnetic disk storage media devices, optical storage media devices, flash memory devices, electrical, optical, acoustical or other physical/tangible (non-transitory) memory storage devices.

The memory 1325 stores instructions for OTV packet routing process logic 1335. Thus, the memory 1325 may comprise one or more computer readable storage media encoded with software comprising computer executable instructions and when the software is executed operable to perform the operations described herein for the process logic 1335. The processor 1310 executes the instructions stored in memory 1325 for process logic 1335 in order to perform the operations described herein.

As will become more apparent from the foregoing description, the processor 1310 generates messages to be transmitted and processes received messages for communication between with at least one edge switch device at another site using the OTV protocol that extends layer 2 network connectivity to layer 3 network connectivity over IP between edge switches at a plurality of sites. The processor 1310 also generates and sends via the OTV protocol a layer 3 message that is configured to advertise the MAC address of the at least one endpoint at a first site to enable the at least one edge switch at a second site to perform multipath routing to the endpoint device at the first site based on each of the edge switches in the edge switch cluster at the first site. Although AED devices above are commonly depicted as "source" and "receiver" AEDs, it should be understood that each AED device may be bidirectional. This is to say that each AED which may be the "source" AED forwarding a source-specific multicast message onto the OTV core network for one multicast may also be a "receiver" AED receiving source-specific multicast messages from the OTV core network for another multicast.

In summary, a method is provided designating an edge device, connected to an OTV network, in a first data center to act as a BAED for an AED for multicast message encapsulation and forwarding. Traffic may be detected from a multicast source in the first data center destined for recipients in a site group, wherein the traffic is associated with a particular VLAN. Mappings may be generated between the site group and a core group in the OTV network for the traffic from the multicast source, and an advertisement may be sent of the mapping to one or more edge devices in a second data center across the OTV network.

In addition, an apparatus (e.g., an edge switch) is provided that comprises a network interface device configured to enable communications over a layer 2 network and over a layer 3 network. Switch hardware may be configured to perform switching operations in the layer 2 network and the layer 3 network. A processor may also be provided configured to be coupled to the network interface device and to the switch hardware circuitry, the processor configured to operate an edge switch at a first data center site that comprises one or more endpoint devices, the processor further configured to receive a designation as a BAED for an AED for multicast message encapsulation and forwarding. Traffic from a multicast source may be detected in the first data center destined for recipients in a site group, wherein the traffic is associated with a particular VLAN. A mapping may be generated between the site group and a core group in the OTV network for the traffic from the multicast source, and an advertisement of the mapping is generated to be sent to one or more edge devices in a second data center across the OTV network.

Further provided herein is one or more computer readable storage media encoded with software comprising computer executable instructions and when the software is executed operable to receive a designation as a BAED for an AED for multicast message encapsulation and forwarding. Traffic from a multicast source may be detected in the first data center destined for recipients in a site group, wherein the traffic is associated with a particular VLAN. A mapping may be generated between the site group and a core group in the OTV network for the traffic from the multicast source, and an advertisement of the mapping is generated to be sent to one or more edge devices in a second data center across the OTV network.

A scheme is presented to ensure rapid and deterministic convergence in an OTV network upon the failure of an AED device. This is accomplished by a model for the backup-AED devices to pre-learn the sources, pre-map to data groups in the multicast core, join the relevant channels, and communicate, maintain, and program all necessary forwarding states to enable instantaneous encapsulation/decapsulation of multicast frames in the event of the failover of the AED device or as soon as an AED failover is detected. Since the solution is independent of the number of OTV Edge devices, or the scale of multicast routes or VLANs enabled in an OTV network, it guarantees ultra-fast convergence in a scaled setup.

This solution has at least the following advantages: The presented scheme guarantees rapid convergence by ensuring that forwarding of multicast frames remains uninterrupted during the failover of an AED device in an OTV network. The solution is deterministic and is independent of the number of OTV sites, edge devices, or number of multicast routes, sources, receivers, or VLANs enabled in the OTV network. This is advantageous over the current behavior where the AED failover causes traffic loss that is significant and of a non-deterministic duration.

The above description is intended by way of example only.

What is claimed is:

1. A method comprising:
receiving a designation at an edge device connected to an overlay transport virtualization (OTV) network in a first data center to act as a failover backup authoritative edge device (BAED) for an authoritative edge device (AED) for multicast message encapsulation and forwarding;
detecting traffic from a multicast source in the first data center destined for recipients in a site group, wherein the traffic is associated with a particular virtual local area network (VLAN);
generating a mapping between the site group and a core group in the OTV network for the traffic from the multicast source;
sending an advertisement of the mapping to one or more edge devices in a second data center across the OTV network,
wherein the mapping is independent of a mapping generated by the BAED between the site group and a core group in the OTV network, and
wherein both the AED and BAED separately send dummy packets to maintain multicast trees in the OTV network, and both the AED and BAED separately advertise respective mappings to edge devices; and
receiving a multicast message from the multicast source and determining from an outgoing interface list (OIL) that the multicast message is to be transmitted via the OTV network.

2. The method of claim 1, wherein the AED and BAED are designated to handle traffic for the particular VLAN or set of VLANs that includes the particular VLAN.

3. The method of claim 1, further comprising, at the BAED, installing encapsulation routes for the traffic from the multicast source; and disabling encapsulation of packets associated with the traffic for transport over the OTV network while the BAED is serving as a backup.

4. The method of claim 3, further comprising:
receiving an indication of a failover of the AED; and
enabling encapsulation of traffic from the multicast source for forwarding across the OTV network in accordance with the mapping to the core group and using the encapsulation routes installed at the BAED.

5. A method comprising:
designating a second edge device connected to an overlay transport virtualization (OTV) network in a second data center to act as a failover backup authoritative edge device (BAED) to an AED for incoming traffic to the second data center from a first data center;
receiving an advertisement sent by one or more edge devices in the first data center, the advertisement indicating a mapping between a site group and a core group in the OTV network for traffic originating from a multicast source in the first data center, wherein the traffic is associated with a particular virtual local area network (VLAN);
joining a multicast tree indicated by the mapping contained in the advertisements;
installing decapsulation routes for the traffic from the multicast source based on the mapping contained in the advertisement to draw traffic for the particular VLAN; and
disabling decapsulation and forwarding of traffic received from the multicast source while the BAED is serving as a failover backup,
wherein the mapping is independent of a mapping generated by the AED, and
wherein both the AED and BAED separately send dummy packets to maintain multicast trees in the OTV network, and both the AED and BAED separately receive advertised mappings.

6. The method of claim 5, further comprising:
receiving an indication of a failover of the AED; and
enabling decapsulation and forwarding of multicast traffic to the receiver in the second data center.

7. The method of claim 5, wherein receiving comprises receiving advertisements from both an AED and a BAED in the first data center associated with the particular VLAN, the advertisement from the AED in the first data center indicating a first mapping between the site group and a first core group in the OTV network, and the advertisement from the BAED in the first data center indicating a second mapping between the site group and a second core group in the OTV network.

8. The method of claim 7, wherein installing comprises installing decapsulation routes for both the first mapping and the second mapping.

9. An apparatus comprising:
switch hardware configured to perform switching operations in a layer 2 network and a layer 3 network; and
a processor configured to be coupled to the switch hardware, the processor configured to operate an edge switch at a first data center site, the processor further configured to:
receive a designation as a failover backup authoritative edge device (BAED) for an authoritative edge device (AED) for multicast message encapsulation and forwarding;
detect traffic from a multicast source in the first data center destined for recipients in a site group, wherein the traffic is associated with a particular virtual local area network (VLAN);
generate a mapping between the site group and a core group in the OTV network for the traffic from the multicast source; and
generate an advertisement of the mapping to be sent to one or more edge devices in a second data center across the OTV network
wherein the mapping is independent of a mapping generated by the BAED between the site group and a core group in the OTV network, and
wherein both the AED and BAED separately send dummy packets to maintain multicast trees in the OTV network, and both the AED and BAED separately advertise respective mappings to edge devices; and receive a multicast message from the multicast source and determining from an outgoing interface list (OIL) that the multicast message is to be transmitted via the OTV network.

10. The apparatus of claim 9, wherein the processor is further configured to install encapsulation routes for the traffic from the multicast source; and disable encapsulation of packets associated with the traffic for transport over the OTV network while the BAED is serving as a backup.

11. The apparatus of claim 9, wherein the processor is further configured to:
receive an indication of a failover of the AED; and
enable encapsulation of traffic from the multicast source for forwarding across the OTV network in accordance with the mapping to the core group and using the encapsulation routes.

12. One or more non-transitory computer readable storage media encoded with software comprising computer executable instructions and when the software is executed by a processor operable to: receive a designation at an edge device connected to an overlay transport virtualization (OTV) network in a first data center to act as a failover backup authoritative edge device (BAED) for an authoritative edge device (AED) for multicast message encapsulation and forwarding; detect traffic from a multicast source in the first data center destined for recipients in a site group, wherein the traffic is associated with a particular virtual local area network (VLAN); generate a mapping between the site group and a core group in the OTV network for the traffic from the multicast source; and generate an advertisement of the mapping to be sent to one or more edge devices in a second data center across the OTV network wherein the mapping is independent of a mapping generated by the BAED between the site group and a core group in the OTV network, and wherein both the AED and BAED separately send dummy packets to maintain multicast trees in the OTV network, and both the AED and BAED separately advertise respective mappings to edge devices; and receive a multicast message from the multicast source and determining from an outgoing interface list (OIL) that the multicast message is to be transmitted via the OTV network.

13. The one or more non-transitory computer readable storage media of claim 12, further comprising instructions operable to:
install encapsulation routes for the traffic from the multicast source; and
disable encapsulation of packets associated with the traffic for transport over the OTV network while the BAED is serving as a backup.

14. The one or more non-transitory computer readable storage media of claim 13, and further comprising instructions that are operable to:
receive an indication of a failover of the AED; and
enable encapsulation of traffic from the multicast source for forwarding across the OTV network in accordance with the mapping to the core group and using the encapsulation routes installed at the BAED.

15. The one or more non-transitory computer readable storage media of claim 12, wherein the AED and BAED are designated to handle traffic for the particular VLAN or set of VLANs that includes the particular VLAN.

* * * * *